Patented Feb. 15, 1949

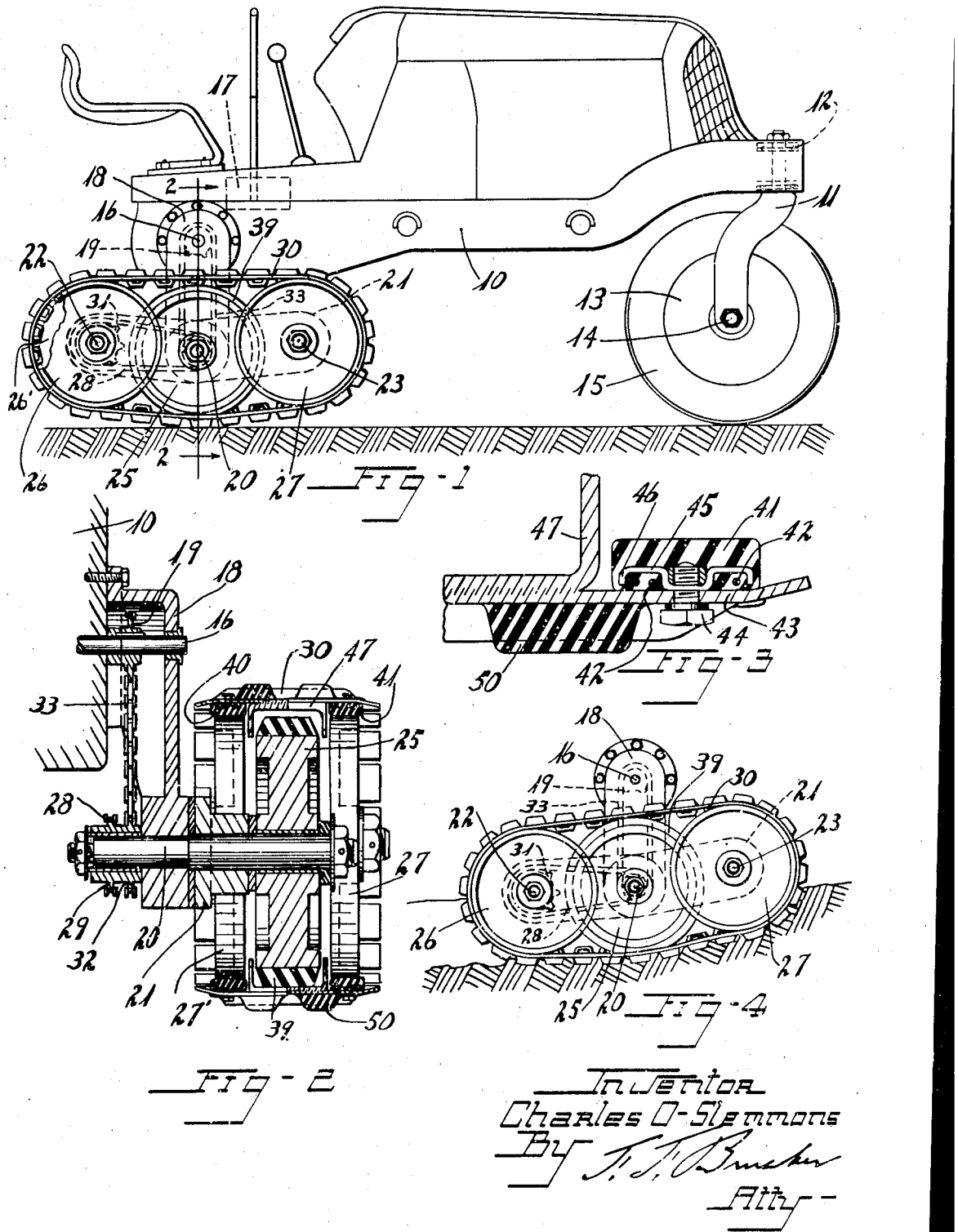
Feb. 15, 1949.     C. O. SLEMMONS     2,461,850
TRACTOR VEHICLE
Filed May 31, 1946

2,461,850

UNITED STATES PATENT OFFICE 2,461,850

TRACTOR VEHICLE

Charles O. Slemmons, South Bend, Ind., assignor to The B. F. Goodrich Company, New York, N. Y., a corporation of New York Application May 31, 1946, Serial No. 673,547

8 Claims. (Cl. 305—8)

This invention relates to tractor vehicles and is especially useful in tractors for agricultural purposes, although the invention is also useful in the construction of tractors for other purposes.

Heretofore, a common type of tractor for agricultural purposes has been equipped with a pair of rear wheels of large diameter which when used for row-crop cultivation over soft ground have sunk objectionably at the rear wheels in soft soil and have entailed danger to the operator in their operation due to the tendency of the tractor to sink at one wheel more than at the opposite one, especially on side sloping ground.

While it has heretofore been proposed to replace the high rear wheels of agricultural tractors with half-track self-laying tracks and thereby to permit cultivation at substantially uniform depths by use of cultivator tools carried directly by the tractor, such vehicles have presented difficulties in operation as the combination of half tracks and steerable front wheels was difficult to steer on soft ground and the flat contact of the half tracks on hard pavements caused scrubbing wear of the tracks due to their high angle of approach and departure from the pavement and their long contact therewith, and undue wear of the tracks and difficulties of steering also occurred on hard pavements.

It is an object of the present invention to provide a tractor which overcomes the foregoing and other difficulties.

Other objects are to reduce scrubbing action of the tracks on pavements, to provide easy steering of the tractor on either pavements or soft soil, to provide a low angle of approach and departure of the tracks to the pavement, to reduce rolling resistance on soft ground, to provide a high degree of flotation on soft soil, to provide steering of the vehicle by manipulation of the tracks, and to provide free castoring of the front wheel or wheels.

These and other objects will appear from the following description and the accompanying drawings.

Of the drawings,

Fig. 1 is a side elevation of a tractor constructed in accordance with and embodying the invention, showing the tractor as operating on a hard pavement.

Fig. 2 is a cross-sectional view of the track and its undercarriage and drive taken on line 2—2 of Fig. 1.

Fig. 3 is a detail cross-sectional view of a portion of the track.

Fig. 4 is a side elevation of the track and undercarriage, showing the position assumed thereby in travelling over soft soil.

Referring to the drawings, the numeral 10 designates the tractor frame which supports the driving mechanism. At the front of the tractor, a castor fork 11 is mounted for free turning about a vertical bearing 12. A wheel 13 is mounted for free rotation therein about an axle 14 located rearwardly of the vertical bearing axis and preferably is provided with a pneumatic tire 15.

The engine of the tractor is connected through transmission means 17 to a pair of laterally extending axle shafts, such as 16, one at each side of the vehicle, the transmission being adapted to drive the tracks selectively for turning or collectively for straight running under control of the operator in a manner well-known. Each axle shaft terminates in a housing 18 fixed to the frame of the tractor, and has a sprocket 19 fixed thereto. A shaft 20 is fixed to the housing 18 parallel to but below the axle shaft 16. A yoke frame 21 is journaled on shaft 20 and carries, at its ends, stub shafts 22, 23. The arrangement is such that the centers of shafts 22, 23 are above the center of shaft 20. Rotatably mounted on shafts 20, 22, 23 respectively are bogie wheels 25, 26, 27. The shaft 22 has a pair of bogie wheels 26, 26' fixed thereto in spaced-apart relation. These wheels are of metal without tires. The shaft 23 has a similar pair of bogie wheels 27, 27' of the same diameter similarly spaced but free running with respect to their shaft. The spacing of the shaft centers is such that the single middle wheel 25 overlaps between the pairs of wheels on shafts 22, 23 and thereby provides close spacing of contact of the wheels with the track reducing the space taken by the track to no greater extent fore and aft of the vehicle than that taken by the ordinary tractor wheel of such tractors. The wheel 25 which is preferably of larger diameter than wheels 26, 26', 27, 27' has a tire 39 of resilient rubber or other rubber-like material for engaging the track 30.

The arrangement is such that wheel 25 clears the upper reach of the track between the wheels 26 and 27 as shown in Fig. 2, and depresses the lower reach of the track at its center so that on hard level pavement the entire load of the vehicle at the tracks is supported through wheel 25 and the track at wheels 26 and 27 clears the pavement which it approaches and recedes from at a small angle, thereby facilitating turning movements and reducing scrubbing abrasion of the tracks.

The rear wheels 26, 26' are fixed to axle 22 which has a bearing through the yoke 21. A sprocket 31 is also fixed to the axle 22 and is adapted to be driven by a chain 28 from a sprocket 29. Sprocket 29 is integral with a sprocket 32 and rotates freely upon shaft 20. A chain 33 drives sprocket 32 from sprocket 19. Wheel 25 is adapted to rotate freely about its shaft 20, and is driven by contact with the lower reach of the track 30 which supports it from the ground.

Track 30 may be of any desirable construction, but as shown comprises parallel endless bands 40, 41 of resilient rubber or other rubber-like material having parallel cables 42 or other inextensible flexible reinforcing elements embedded therein and extending longitudinally thereof in spaced-apart relation. The bands are well spaced from each other laterally of the track to provide resilient runners for wheels 26, 26', 27, 27' and are secured to metal shoes 43, as by bolts 44 engaging anchoring members 45 embedded in the bands.

The anchoring members 45 have threaded hubs to receive the bolts 44 and also have wings 46 which extend about the cables to retain them but clear the cables by being separated therefrom by resilient rubber-like material so as to cushion them.

U-shaped guides 47 are secured, as by welding, to the shoes and straddle the wheel 25 and its tire 39 to guide the track. The shoes may have rubber treads 50 vulcanized thereto to provide against wear and to further cushion the vehicle.

The yoke frame 21 may float freely on the shaft 20 in a vertical plane so as to permit rising and lowering of the front and rear wheels 27, 27', 26, 26' for accommodation to the contour of the ground providing easy steering on hard surfaces, as the central wheel 25 is slightly lower than the front and rear wheels and carries the entire load of the vehicle on hard pavements, and also provides low rolling resistance in soft soil as the front bogie will be able to rise and ride higher than the middle and rear bogies as shown in Fig. 4. When operating on soft ground, the yoke will tip to an optimum position where the load will be distributed equally over the three bogie wheels of each track. Stops for limiting rocking movement of the yoke 21 may be provided.

If desired, the fork 11 may be provided with a pair of coaxial wheels, one at each side of the fork in place of the single wheel 13 so as to provide for cultivation of several rows, the front wheels riding between rows.

Due to the pivoting of the yokes at the axis of wheel 25, the tendency for the yoke to be rotated thereabout by the combination of forces acting thereon such as the draw-bar pull, the resistance of the ground, the weight of the vehicle and the rolling friction of the wheels and track is reduced to a minimum amount providing a high degree of stability of the drive structure. As the lowest portion of the ground-contacting reach of the track is at the wheel 25, the track approaches and leaves a flat pavement at a small acute angle, thereby facilitating turning movements of the vehicle and reducing abrasion of the track by scrubbing action.

The provision of the half tracks and the castoring front wheel provides for mounting of cultivating equipment between them and reduces forward and aft rocking of the tractor so that cultivation at substantially uniform depth is possible.

By selectively driving the two tracks, accomplished by manipulation of the transmission in any suitable manner, easy steering of the vehicle is accomplished and the castored front wheel, or wheels where more than one is provided, require no manual manipulation permitting greater use of row-crop cultivating tools.

Variations may be made without departing from the scope of the invention as it is defined by the following claims.

I claim:

1. A tractor vehicle having a pair of undercarriages, each undercarriage comprising front, rear and intermediate bogie wheels, the intermediate bogie wheel being mounted for free-running with the lowermost point of its perimeter lower than the lowermost points of the front and rear bogie wheels for sustaining the entire weight of the undercarriage on a flat surface through said intermediate bogie wheel, said undercarriage being pivotally mounted on said vehicle for movement about the axis of said intermediate bogie wheel, a flexible track trained about all said bogie wheels of the undercarriage, and means driving said track entirely through said rear bogie wheels.

2. A tractor vehicle having a pair of undercarriages, each undercarriage comprising a pair of laterally spaced-apart front bogie wheels, a pair of laterally spaced-apart rear bogie wheels, and an intermediate bogie wheel, said intermediate bogie wheel being mounted with the lowermost point of its perimeter lower than the lowermost points of said front and rear free-running bogie wheels for sustaining the entire load of the undercarriage on a flat surface through said intermediate bogie wheel, said undercarriage being pivotally mounted on said vehicle for movement about the axis of said intermediate bogie wheel, a flexible track trained about all said bogie wheels of the undercarriage, and means for driving said track entirely through said rear bogie wheels.

3. A tractor vehicle having a pair of undercarriages, each undercarriage comprising a pair of laterally spaced-apart front bogie wheels, a pair of laterally spaced-apart rear bogie wheels, and an intermediate bogie wheel, said intermediate bogie wheel being mounted with the lowermost point of its perimeter lower than the lowermost points of said front and rear bogie wheels, said undercarriage being pivotally mounted on said vehicle for movement about the axis of said intermediate bogie wheel, and a flexible track trained about all said bogie wheels of the undercarriage, said track having a pair of resilient runners contacting said front and rear bogie wheels and said intermediate bogie wheel having a resilient tread for engaging said track between said runners.

4. A tractor vehicle having a pair of undercarriages pivotally supported thereon for rocking movement in parallel vertical planes longitudinal of the vehicle, each undercarriage comprising front, rear and intermediate bogie wheels, said intermediate bogie wheel having its axis lower than said front and rear bogie wheels and being at least as large in diameter as said front and rear bogie wheels, and a flexible track trained about all said bogie wheels, said intermediate bogie wheel having a resilient tread for engaging the inner surface of the lower reach of said track in driving relation thereto.

5. A tractor vehicle having drive shafts for driving a pair of self-laying tracks and a pair of undercarriages pivotally supported by said vehicle below said shafts for rocking vertical movements in planes longitudinal of the vehicle, each undercarriage comprising front, rear and intermediate bogie wheels, said intermediate bogie wheel being rotatable about the pivotal axis of said undercarriage, said front and rear bogie wheels being rotatable about axes located in a plane passing above said pivotal axis, and a flexible track encompassing all said bogie wheels.

6. A tractor vehicle having oppositely extending drive shafts for driving a pair of self-laying tracks and a pair of undercarriages pivotally supported by said vehicle below said shafts for rocking vertical movements in planes longitudinal of the vehicle, each undercarriage comprising front, rear and intermediate bogie wheels in overlapping relation, said intermediate bogie wheel being rotatable about the pivotal axis of said undercarriage, said front and rear bogie wheels being rotatable about axes located in a plane passing above said pivotal axis, and a flexible track encompassing all said bogie wheels.

7. A tractor vehicle having a pair of undercarriages, each undercarriage comprising a frame structure pivotally mounted intermediate its front and rear end for movement about a horizontal axis, front, rear and intermediate bogie wheels rotatably mounted on said frame structure, and an endless flexible track encompassing said bogie wheels, said intermediate bogie wheel being freely rotatable about the pivotal axis of said frame structure and supporting substantially the entire load on said undercarriage through said intermediate bogie wheel and the lower reach of said track, said front and rear bogie wheels being rotatable about axes above the level of the axis of said intermediate bogie wheel in the level condition of the vehicle and being of no greater diameter than said intermediate bogie wheel, and means for rotating said rear bogie wheel to drive said track at any pivotal position of the undercarriage.

8. A tractor vehicle having a pair of undercarriages, each undercarriage comprising a frame structure pivotally mounted intermediate its front and rear end for movement about a horizontal axis, front, rear and intermediate bogie wheels rotatably mounted on said frame structure, and an endless flexible track encompassing said bogie wheels, said intermediate bogie wheel being freely rotatable about the pivotal axis of said frame structure and supporting substantially the entire load on said undercarriage through the lower reach of said track, said front and rear bogie wheels overlapping said intermediate bogie wheel in the fore and aft direction, and said front and rear wheels being of no greater diameter than said intermediate bogie wheel and being rotatable about axes above the level of the axis of said intermediate bogie wheel, and means for rotating said rear bogie wheel to drive said track at any pivotal position of the undercarriage.

CHARLES O. SLEMMONS.

REFERENCES CITED

The following references are of record in the file of this patent:

UNITED STATES PATENTS

| Number | Name | Date |
| --- | --- | --- |
| 1,232,482 | Best | July 10, 1917 |
| 1,388,750 | Palmer | Aug. 23, 1921 |
| 1,812,875 | Henneuse | July 7, 1931 |

Certificate of Correction

Patent No. 2,461,850. February 15, 1949.

CHARLES O. SLEMMONS

It is hereby certified that errors appear in the printed specification of the above numbered patent requiring correction as follows:

Column 4, line 35, claim 2, before "bogie" strike out the word "free-running" and insert the same in line 32, same claim, before "bogie";

and that the said Letters Patent should be read with these corrections therein that the same may conform to the record of the case in the Patent Office.

Signed and sealed this 22nd day of November, A. D. 1949.

[SEAL]

THOMAS F. MURPHY,
*Assistant Commissioner of Patents.*